United States Patent
Yang

(10) Patent No.: US 9,575,590 B2
(45) Date of Patent: Feb. 21, 2017

(54) INPUT METHOD AND INPUT APPARATUS

(71) Applicants: Beijing Lenovo Software Ltd., Haidian District, Beijing (CN); Lenovo (Beijing) Co., Ltd., Beijing (CN)

(72) Inventor: Guang Yang, Beijing (CN)

(73) Assignees: BEIJING LENOVO SOFTWARE LTD, Haidian District, Beijing (CN); LENOVO (BEIJING) CO., LTD, Haidian District, Beijing (CN)

( * ) Notice: Subject to any disclaimer, the term of this patent is extended or adjusted under 35 U.S.C. 154(b) by 400 days.

(21) Appl. No.: 14/090,151

(22) Filed: Nov. 26, 2013

(65) Prior Publication Data
US 2014/0146018 A1    May 29, 2014

(30) Foreign Application Priority Data

Nov. 27, 2012  (CN) .......................... 2012 1 0491161
Sep. 6, 2013   (CN) .......................... 2013 1 0403596

(51) Int. Cl.
*G06F 3/041*  (2006.01)
*G06F 3/03*   (2006.01)
*G06F 3/0354* (2013.01)

(52) U.S. Cl.
CPC .......... *G06F 3/0416* (2013.01); *G06F 3/0308* (2013.01); *G06F 3/0325* (2013.01); *G06F 3/03545* (2013.01)

(58) Field of Classification Search
CPC .. G06F 3/03545; G06F 3/0416; G06F 3/0308; G06F 3/0325
See application file for complete search history.

(56) References Cited

U.S. PATENT DOCUMENTS 8,319,440 B2    11/2012  Schenk
2004/0086181 A1*  5/2004  Wang .................. G06F 3/03545
                                                382/182
(Continued)

FOREIGN PATENT DOCUMENTS

CN    101884248    11/2010
CN    101989379     3/2011
(Continued)

OTHER PUBLICATIONS

First Office Action dated Jul. 4, 2016 out of Chinese priority Application No. 201310403596.5 (12 pages including English translation).

*Primary Examiner* — William Boddie
*Assistant Examiner* — Saifeldin Elnafia
(74) *Attorney, Agent, or Firm* — Brinks Gilson & Lione; G. Peter Nichols

(57) ABSTRACT

The present disclosure discloses an input method and an input apparatus. The input apparatus is able to communicate with an electronic apparatus. The electronic apparatus includes a touch control display unit. The method includes a recognizing device in the input apparatus recognizing to obtain a first shape under press of a contact pressure of the input end based on a light-reflective encode coating when the deformable input end of the input apparatus contacts with the touch control display unit; the recognizing device obtaining a deformation parameter of the input end based on the first shape; and a transmitting device in the input apparatus transmitting the deformation parameter to the electronic apparatus to be processed by the electronic apparatus.

17 Claims, 4 Drawing Sheets

(56) References Cited

U.S. PATENT DOCUMENTS

| | | | |
|---|---|---|---|
| 2006/0001654 A1* | 1/2006 | Smits | G06F 3/03542 345/176 |
| 2006/0024617 A1* | 2/2006 | Gonzalez | G06F 3/03545 430/311 |
| 2007/0097101 A1* | 5/2007 | Hunter | G06F 3/0317 345/179 |
| 2009/0153526 A1* | 6/2009 | Blake | G06F 3/043 345/179 |
| 2010/0176732 A1 | 7/2010 | Schenk | |
| 2011/0128254 A1 | 6/2011 | Teranishi | |
| 2013/0229390 A1* | 9/2013 | DiVerdi | G06F 3/0488 345/179 |
| 2014/0078109 A1* | 3/2014 | Armstrong-Muntner | G06F 3/03545 345/175 |

FOREIGN PATENT DOCUMENTS

| | | |
|---|---|---|
| CN | 102055836 | 5/2011 |
| WO | WO 2012/066541 | 5/2012 |

\* cited by examiner

INPUT METHOD AND INPUT APPARATUS

BACKGROUND

This application claims priority to Chinese patent application No. 201210491161.6 filed on Nov. 27, 2012, and to Chinese patent application No. 201310403596.5 filed on Sep. 6, 2013, the entire contents of which are incorporated herein by reference.

The present invention relates to the field of communications and electronics, and in particular to input method and input apparatus.

With the progressive development of the touch control display technique, the resistive display screen has been substituted by the capacitive display screen which is able to display requirements of the user more clearly.

People can operate, for example, draw pictures, write signatures or the like on the touch control input unit of the electronic apparatus by input devices such as a touch control input pen or the like, the operation is very convenient.

In the prior arts, when the user writes words or draws pictures on the touch control display screen by using the touch control input pen, the position of the corresponding touch control point is determined by the variation of the capacitance value at the touch control point on the capacitive screen by touching the touch control capacitive screen by the human body so as to output displayed effect.

The inventor of this application found at least the following technical problems in the prior arts in the procedure of implementing the technical solutions of the embodiments of this application:

Since when people operate on the touch control display unit using the touch control input pen in the prior arts, the position of the touch control point is recognized by the variation of the capacitance value on the touch control display unit and the output effect is displayed, display effect of only one point can be displayed, and when the sizes of the contact areas on the touch control display unit with the input pen are different, there is a technical problem that the size and degree of weight of the contact point cannot be recognized effectively so that the effect of the pen contacting of the user cannot be responded accurately.

Since there is the above-described technical problem, when the user uses a capacitive pen of the prior arts to write on the touch control display screen, there is no real operational sense and the experience of the user is relatively poor.

SUMMARY

By providing an input method and an input apparatus, the embodiment of this application solves the technical problem that when the contact faces of the touch control display unit with the input apparatus are different in the prior arts, since size and degree of weight of the touch control point cannot be recognized effectively, the requirement of the effect of pen contacting of the user cannot be responded accurately.

An aspect of the embodiments of the present disclosure provides an input method applied in an input apparatus being able to communicate with an electronic apparatus including a touch control display unit, the method including: a recognizing device in the input apparatus recognizing to obtain a first shape under the press of contact pressure of a deformable input end based on a light-reflective encode coating when the input end of the input apparatus contacts with the touch control display unit; the recognizing device obtaining a deformation parameter of the input end based on the first shape; and a transmitting device in the input apparatus transmitting the deformation parameter to the electronic apparatus to be processed by the electronic apparatus.

Further, when the recognizing device is specifically an image pick-up unit, the recognizing device in the input apparatus recognizing to obtain the first shape under press of the contact pressure of the input end based on the light-reflective encode coating specifically includes: when the input end contacts with the touch control display unit, obtaining image information including the light-reflective encode coating by the image pick-up unit; analyzing and recognizing the image information to determine that the current form of the light-reflective disperse point distribution of the light-reflective encode coating is a first form; and determining that a shape corresponding to the first form is the first shape based on a first correspondence relationship between the form of the light-reflective disperse point distribution and the shape of the input end.

Further, the recognizing device obtaining the deformation parameter of the input end based on the first shape is specifically: determining a first deformation parameter corresponding to the first shape as the deformation parameter of the input end based on a second correspondence relationship between the shape and the parameter.

Further, determining the first deformation parameter corresponding to the first shape as the deformation parameter of the input end based on the second correspondence relationship between the shape and the parameter specifically includes: determining a first contact area of the input end on the touch control display unit corresponding to the first shape when the second correspondence relationship is specifically a correspondence relationship between the shape and the contact area.

Further, after the recognizing device in the input apparatus recognizing to obtain the first shape under press of the contact pressure of the input end based on the light-reflective encode coating, the method further includes: determining first contact position information corresponding to the first form based on a third correspondence relationship between the form of light-reflective disperse point distribution and the contact position of the input end; and transmitting the first contact position information to the electronic apparatus to be processed by the electronic apparatus.

Further, after the recognizing device in the input apparatus recognizing to obtain the first shape under press of the contact pressure of the input end based on the light-reflective encode coating, the method further includes: determining first angle information corresponding to the first form based on a fourth correspondence relationship between the form of light-reflective disperse point distribution and the angle, the first angle information being specifically information of angle between the input apparatus and the touch control display unit when the input end contacts with the touch control display unit; and transmitting the first angle information to the electronic apparatus to be processed by the electronic apparatus.

Further, the transmitting device in the input apparatus transmitting the deformation parameter to the electronic apparatus is specifically: a wireless transmitting device in the input apparatus transferring the deformation parameter to the electronic apparatus in a wireless mode; or a wired transmitting device in the input apparatus transferring the deformation parameter to the electronic apparatus in a wired mode.

Another aspect of the embodiments of the present disclosure provides an input apparatus which is able to communicate with an electronic apparatus including a touch control display unit, the input apparatus including: an input end made of electro-conductive deformable material and in which a light-reflective encode coating is provided; a hold body connected to the input end and in which a recognizing device and a transmitting device are provided; wherein, when the input end contacts with the touch control display unit, the recognizing device recognizes to obtain a first shape under press of contact pressure of the input end based on the light-reflective encode coating, and obtains a deformation parameter of the input end based on the first shape; the deformation parameter is transmitted to the electronic apparatus by the transmitting device to be processed by the electronic apparatus.

Further, the recognizing device includes: an image pick-up unit for obtaining image information including the light-reflective encode coating when the input end contacts with the touch control display unit; a first determining unit for analyzing and recognizing the image information to determine that a current form of the light-reflective disperse point distribution of the light-reflective encode coating is a first form; and a second determining unit for determining that a shape corresponding to the first form is the first shape based on a first correspondence relationship between the form of light-reflective disperse point distribution and the shape of the input end.

Also, the recognizing device further includes a third determining unit for determining a first deformation parameter corresponding to the first shape as the deformation parameter of the input end based on a second correspondence relationship between the shape and the parameter.

Further, the third determining unit is specifically a determining unit for determining a first contact area of the input end on the touch control display unit corresponding to the first shape when the second correspondence relationship is specifically a correspondence relationship between the shape and the contact area.

Also, the recognizing device further includes a fourth determining unit for determining first contact position information corresponding to the first form based on a third correspondence relationship between the form of light-reflective disperse point distribution and contact position of the input end, wherein, the first contact position information can be transmitted to the electronic apparatus by the transmitting device to be processed by the electronic apparatus.

One or more technical solutions provided by the embodiments of this application at least have the following technical effects or advantages:

Since the recognizing device is adopted to obtain the first shape under press of contact pressure of the input end based on the light-reflective encode coating, and then the deformation parameter is transmitted to the touch control display unit based on the deformation parameter of the first shape, the technical problem that when the user operates on the touch control display unit using the touch control input pen, position of the touch control point is recognized through variation of capacitance value on the touch control display unit and output effect is displayed in the prior arts, display effect of only one point is displayed, and when the sizes of the contact areas of the input pen with the touch control display unit are different, size and degree of weight of the touch control point cannot be recognized effectively is solved, and technical effect of recognizing size and degree of weight of the touch control point effectively and responding to the requirement of the effect of pen contact accurately according to user's need is implemented.

BRIEF DESCRIPTION OF THE DRAWINGS

In order to describe the technical solutions of the embodiments of the present invention more clearly, the accompanying drawings necessary for the description of the embodiments are explained simply. The accompanying drawings in the following description are only exemplary embodiments of the present invention.

DETAILED DESCRIPTION

The first embodiment of the present disclosure solves, by providing an input method, the technical problem that the requirement of effect of pen contact of the user cannot be responded accurately since the size and degree of weight of the touch control point cannot be recognized effectively in the prior art.

The overall concept of the technical solution in the first embodiment of the present disclosure for solving the above technical problem is as follows:

When the user uses the input apparatus, the operation of the user is reflected by deformation generated by the contact of the input apparatus with the touch control display unit. Of course, when deformation generated in the input apparatus is reflected by variation of form of the light-reflective encode coating in the input apparatus, a recognizing device is provided in the input apparatus and can recognize variation of forms of the light-reflective encode coating, intercept the variation of forms of the light-reflective encode coating as deformation generated by the contact of the input apparatus with the touch control display unit, and transfer the result of the deformation to the electronic apparatus connected to the input apparatus, and the electronic apparatus output the result of the deformation by a display screen, to achieve effect of pen contact needed by the user.

For understanding the above-described technical solution better, the above-described technical solution is explained in detail in combination with the accompanying drawings of the specification and the specific implementation modes.

An aspect of the first embodiment of the present disclosure provides an input method applied in an input apparatus being able to communicate with an electronic apparatus including a touch control display unit. In a specific implementation procedure, the input apparatus may be a touch control input pen, or also a touch control input device having a similar function, and no limitation is made here, the electronic apparatus may be a tablet computer having a touch control screen, or also other kinds of electronic apparatus connected to a touch control input unit, and no limitation is made here.

In the following description, it is described in detail by taking the input apparatus as touch control input pen and the electronic apparatus as tablet computer as example.

Figure 1:
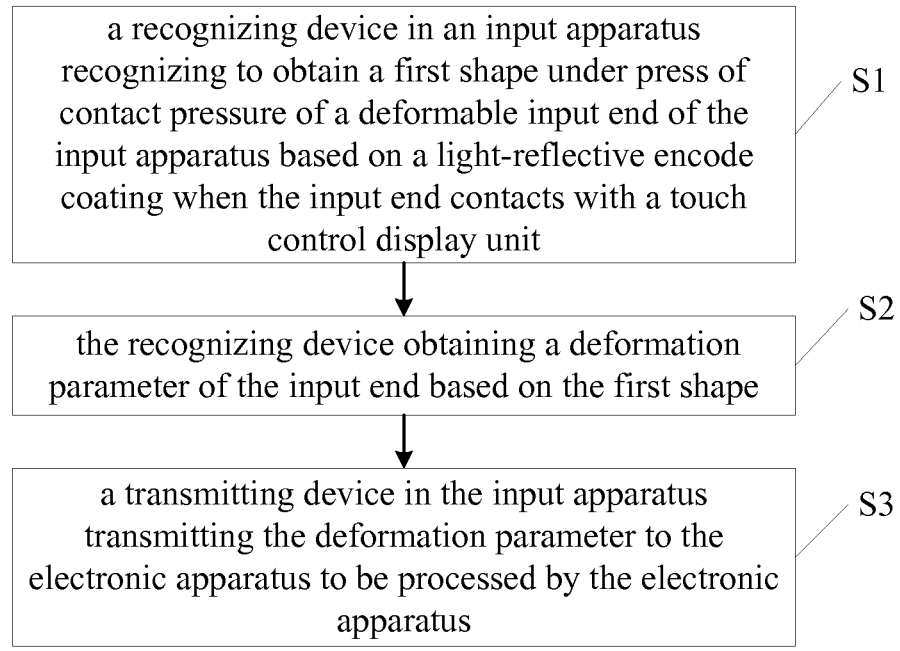
FIG. 1 is a flow chart of the input method of the first embodiment of the present disclosure.

With reference to FIG. 1, FIG. 1 is a flow chart of the input method provided by the first embodiment of this application, the method includes the following steps:

S1, the recognizing device in the input apparatus recognizes to obtain a first shape under press of contact pressure of a deformable input end based on the light-reflective encode coating when the input end of the input apparatus contacts with the touch control display unit.

S2, the recognizing device obtains a deformation parameter of the input end based on the first shape.

S3, the transmitting device in the input apparatus transmits the deformation parameter to the electronic apparatus to be processed by the electronic apparatus.

In the embodiments of this application, the input apparatus is specifically the touch control input pen, the pen tip of the touch control input pen is made of conductive rubber, and when the touch control input pen contacts with the touch control display unit of the tablet computer, the conductive rubber of the pen tips will generate deformation. Of course, the touch control input pen can be used not only on the touch control display unit of the tablet computer, and also on arbitrary touch control plane of non-capacitive type.

In S1, the recognizing device in the input apparatus recognizing to obtain the first shape under press of the contact pressure of the input end based on the light-reflective encode coating specifically includes:

obtaining image information including the light-reflective encode coating through an image pick-up unit when the input end contacts with the touch control display unit;

analyzing and recognizing the image information to determine that a current form of light-reflective disperse point distribution of the light-reflective encode coating is a first form; and determining that the shape corresponding to the first form is the first shape based on a first correspondence relationship between the form of light-reflective disperse point distribution and the shape of the input end.

In a specific implementation mode, when the touch control input pen contacts with the touch control display unit of the tablet computer, the image pick-up unit provided in the touch control input pen will collect image information of the light-reflective encode coating provided in the part of pen tips of the touch control input pen, wherein, the image pick-up unit may be a micro camera in which an original image distribution of the light-reflective encode coating at the natural status when the touch control input pen does not contact with any plane is saved. Generally, disperse points of the light-reflective encode coating in the pen tips of the touch control input pen at the natural status are evenly distributed, and pitches of the respective disperse point are equal to each other.

When the touch control input pen contacts with the touch control display unit of the tablet computer, deformation is generated at the part of pen tips, the deformation causes variation of the disperse point distribution of the light-reflective encode coating in the pen tips, by providing a micro camera in the pen arm, an image of variation of forms of the disperse point of the light-reflective encode coating at this time can be captured, and the captured image is stored in a storing unit in the touch control input pen.

Figure 2:
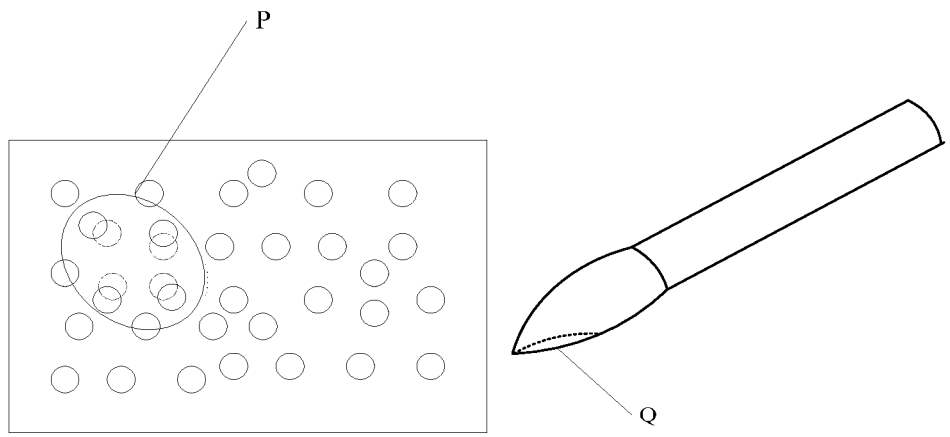
FIG. 2 is a schematic diagram of variation of the shape of the touch control input pen corresponding to the form of light-reflective disperse point distribution in the first embodiment of the present disclosure.

Thereafter, the captured image of variation of forms of the disperse point of the light-reflective encode coating is compared with the image of an even distribution of the disperse point of the light-reflective encode coating at the natural status, and then variation of shape of the touch control input pen corresponding to the image of variation of forms, that is, the first shape in step S1, is determined according to a result of the comparison. For example, the disperse point distribution of the light-reflective encode coating is as shown in FIG. 2, disperse point in partial region moves in position with respect to the even distribution of the disperse point, a part Q of the contact of the touch control input pen corresponding to the part where the position P of the disperse point moves is a variation of shape of concave form.

S2 of the recognizing device obtaining the deformation parameter of the input end based on the first shape is executed after obtaining the first shape under press of the contact pressure of the input end.

Wherein, the recognizing device obtaining the deformation parameter of the input end based on the first shape is specifically: determining a first deformation parameter corresponding to the first shape as the deformation parameter of the input end based on a second correspondence relationship between the shape and the parameter.

In the embodiments of this application, the second correspondence relationship is specifically a correspondence relationship between the shape and the contact area, and the recognizing device can determine a first contact area of the input end on the touch control display unit corresponding to the first shape based on this correspondence relationship.

In a specific implementation mode, due to variation of the shape of the touch control input pen, some corresponding deformation parameters would vary, for example, the parts of variation of the shape of the touch control input pen are different, or angles of the touch control input pen with the contact face are different, contact areas of the contact part are different, still further, forces of the user using the touch control input pen are different. Due to the difference of these parameters, the effect of the output on the touch control display screen of the tablet will be different. For example, when the user draws a line on the touch control display screen of the tablet using the touch control input pen, as the deformation parameter of the touch control input pen shows that the contact area is large, it reflects that the number of the light-reflective disperse point moving in position is more on the light-reflective disperse point of the light-reflective encode coating, thus, the output line displayed in the touch control display unit is thicker, and when the contact area is small, it reflects that the number of the light-reflective disperse point moving in position is less on the light-reflective disperse point of the light-reflective encode coating, thus, the output line is thinner.

Since a line is constituted by points, in the prior arts, position of the touch control point is recognized by variation of capacitance value on the touch control display unit and output effect is displayed, so that the touch control display unit can only recognize that it is one point, but cannot recognize a size of the point, so thick or thin of the line constituted by points cannot be recognized. It is known from the above-described solution described in the embodiments of this application, since the touch control input pen can recognize the size of the contact area with the touch control display unit, and transfer the information of the size of the contact area to the touch control display unit, it solves technical problem that the size of the contact area cannot be recognized so that thick or thin of the line cannot be recognized in the prior art, so as to reflect requirement of pen contact of the user effectively and accurately, and also facilitate drawing operations such as sketch or the like by the user using the touch control input pen.

Of course, in the embodiments of this application, due to variation of the form of light-reflective disperse point distribution, contact position of the input end can also be recognized. It is specifically determining first contact position information corresponding to the first shape based on a third correspondence relationship between the form of light-reflective disperse point distribution and the contact position of the input end; and after obtaining the first contact position information, the first contact position information can be transmitted to the electronic apparatus to be processed by the electronic apparatus, for example, carrying out a processing of responding to the touch control operation.

Figure 3:
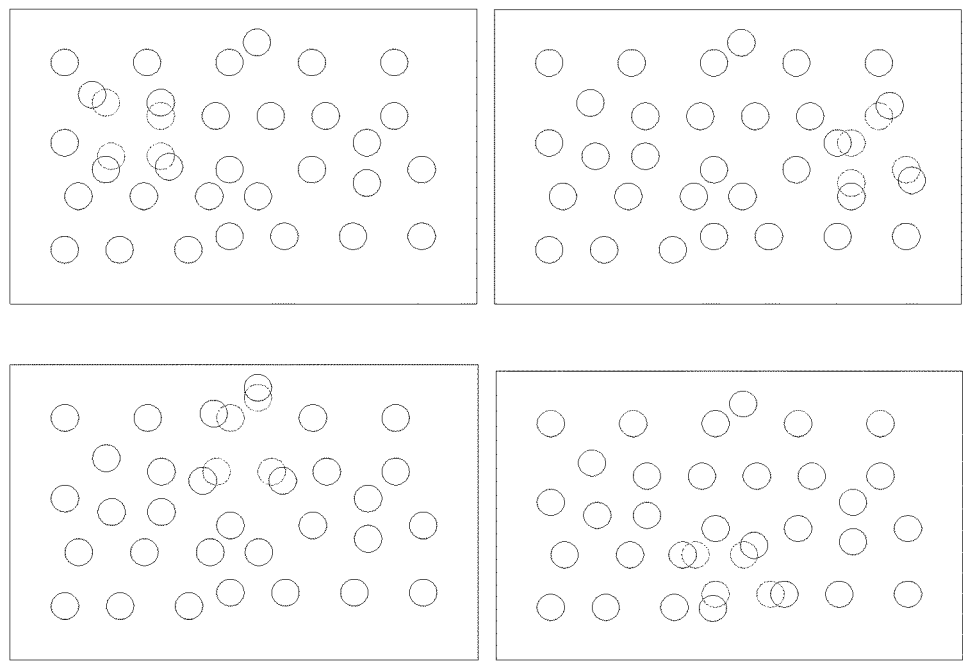
FIG. 3 is a schematic diagram of contact of different parts of pen tips of the touch control input pen corresponding to the form of light-reflective disperse point distribution in the first embodiment of the present disclosure.

In a specific implementation mode, as shown in FIG. 3, when the contact position of the pen tips of the touch control input pen with the flat panel display unit is the first contact position, the distribution of the corresponding light-reflective disperse point is at a position closer to the left of visual field in the shot image; and when the contact position of the pen tips of the touch control input pen with the panel display unit after turning 180 degree is a second contact position, the distribution of the corresponding light-reflective disperse point is at a position closer to the right of visual field in the shot image, similarly, when the contact position of the pen tips of the touch control input pen with the panel display unit after turning 90 degree is a third contact position, the distribution of the corresponding light-reflective disperse point is at a position closer to the top of visual field in the shot image, or when the contact position of the pen tips of the touch control input pen with the panel display unit is a fourth contact position, the distribution of the corresponding light-reflective disperse point is at a position closer to the bottom of visual field in the shot image. Thereby it can be known that the contact position of the touch control input pen contacting with the flat panel display unit can be determined from the situation of the distribution of the light-reflective disperse point.

Due to determination of the contact position information, output effects corresponding to different contact position information are different. Besides the above-described contact position information, the contact position information of the touch control input pen with the touch control display unit can be determined by a concrete coordinate position of the light-reflective disperse point in the above-described shot image. It is specifically:

When the concrete coordinate position shows that the position of the touch control input pen contacting with the touch control display unit is closer to the part of tips, the strength of color is lighter at the upper part of the line and the strength of color is deeper at the lower part of line in the drawn line; and when the concrete coordinate position shows that the position of the touch control input pen contacting with the touch control display unit is far from the part of tips, the region with deeper color at the lower part of the line will occupy a larger part in the drawn line.

It can be seen that, by adopting the technical means of the touch control input pen recognizing information of touch control contact position, the technical problem that the contact position information of the touch control input pen cannot be recognized so that user operation cannot be responded by the contact position information in the prior art is solved, requirement of pen contact of the user is responded accurately and effectively.

On the other hand, in the embodiments of this application, first angle information corresponding to the first form can be determined based on a fourth correspondence relationship between the form of light-reflective disperse point distribution and angles, the first angle information is specifically information of angle between the input apparatus and the touch control display unit when the input end contacts with the touch control display unit, and after obtaining the first angle information, the first angle information can be transmitted to the electronic apparatus to be processed by the electronic apparatus, for example, a processing of responding to the output effect under the angle status is executed based on the first angle information.

In a specific implementation procedure, output effects corresponding to different angle information are different. According to variation of forms of the light-reflective encode coating, information of the angle of the touch control input pen contacting with the flat panel display unit can be recognized, of course, the information of the angle is generally determined by posture of the user holding the pen, and magnitude of the angle of the posture of holding the pen with respect to the horizontal face is reflected by image information of the distribution of the light-reflective disperse point, and then the information of the angle is transmitted to a processing chip in the pen arm. For example, the smaller the angle between the touch control input pen and the flat panel display unit is, the position of the disperse point of the light-reflective disperse point away from a central position moves and has a greater number, and the thicker the line drawn by the user using the touch control input pen is, however, since the forces are even, the shown color is lighter, which is suitable for a coloring operation. When the angle between the touch control input pen and the flat panel unit is larger, the disperse point position of the light-reflective disperse point closer to the central position moves and has a less number, thus, the line drawn by the user using the touch control input pen is very thin, which is suitable for an outlining operation as drawing.

S3 of the transmitting device in the input apparatus transmitting deformation parameter to the electronic apparatus to be processed by the electronic apparatus is executed after the position information parameter, the contact area information parameter and the angle information parameter related to the first deformation of the input end are recognized.

Wherein, the transmitting device in the input apparatus transmits the deformation parameter to the electronic apparatus, and the concrete transmission mode is:

a wireless transmission device in the input apparatus transmits the deformation parameter to the electronic apparatus in a wireless mode; or a wired transmission device in the input apparatus transfers the deformation parameter to the electronic apparatus in wired mode.

In a specific implementation mode, when a wireless transmission unit is provided in the pen arm of the touch control input pen, when deformation parameter information of the touch control input pen is recognized, this information parameter is transferred to the wireless transmission unit, which reflects this deformation parameter information on the flat panel display unit, that is, when the deformation parameter is that the contact area is large, the deformation parameter can be transferred to the electronic apparatus by the wireless transmission device; and when the deformation parameter is that the contact position is a position closer to the pen tips, the deformation parameter can be also transferred to the electronic apparatus in a wireless transmission mode.

The above-described wireless transmission device is suitable for a case that the touch control input pen and the flat panel display are separated; when the touch control input pen is connected to the flat panel display unit through a wired transmission device, the touch control input pen can operate not only on the flat panel display unit, and also on other arbitrary touch plane of non-capacitive type, so long as there is action of a press force, deformation of the touch control input pen can be recognized, and then the deformation parameter can be transferred to the electronic apparatus through a wired transmission device.

Of course, when a wireless transmission device is provided in the touch control input pen, there needs to provide a corresponding wireless reception device paired with the wireless transmission device in the electronic apparatus and for receiving signals transmitted by the wireless transmission device.

When the touch control input pen transmits signals through the wired transmission device, the touch control input pen is connected to the electronic apparatus through the wired transmission device, and a wire reception device paired with the wired transmission device is provided in the electronic apparatus likewise, so as to facilitate reception of the transferred signals by the wired transmission device.

Figure 4:
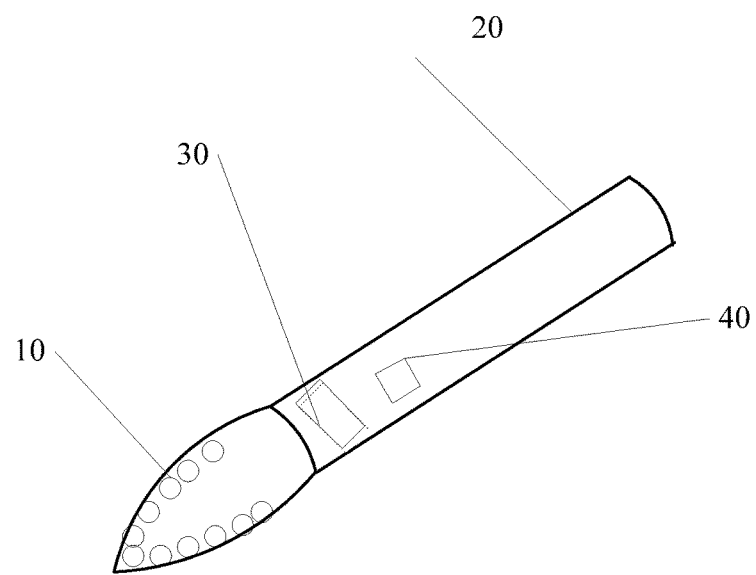
FIG. 4 is a structural diagram of the input apparatus in the first embodiment of the present disclosure.

With reference to FIG. 4, the first embodiment of this application further provides an input apparatus which is able to communicate with an electronic apparatus including a touch control display unit, the input apparatus including:

an input end 10 made of electro-conductive deformable material and in which a light-reflective encode coating is provided; and a hold body 20 connected to the input end 10 and in which a recognizing device 30 and a transmitting device 40 are provided;

wherein, when the input end contacts with the touch control display unit, the recognizing device recognizes to obtain the first shape under press of the contact pressure of the input end based on the light-reflective encode coating, and obtains a deformation parameter of the input end based on the first shape; the deformation parameter is transmitted to the electronic apparatus by the transmitting device to be processed by the electronic apparatus.

The recognizing device 30 further includes:

an image pick-up unit by which image information including the light-reflective encode coating is obtained when the input end contacts with the touch control display unit;

a first determining unit for analyzing and recognizing the image information to determine that a current form of light-reflective disperse point distribution of the light-reflective encode coating is the first form; and a second determining unit for determining that the shape corresponding to the first form is the first shape based on a first correspondence relationship between the form of light-reflective disperse point distribution and the shape of the input end.

The recognizing device 30 further includes:

a third determining unit for determining a first deformation parameter corresponding to the first shape as the deformation parameter of the input end based on a second correspondence relationship between the shape and the parameter.

Wherein, the third determining unit is specifically a determining unit for determining a first contact area of the input end on the touch control display unit corresponding to the first shape when the second correspondence relationship is specifically a correspondence relationship between the shape and the contact area.

The recognizing device 30 further includes: a fourth determining unit for determining first contact position information corresponding to the first form based on a third correspondence relationship between the form of light-reflective disperse point distribution and contact position of the input end, wherein, the first contact position information can be transmitted to the electronic apparatus by the transmitting device to be processed by the electronic apparatus.

The recognizing device 30 further include: a fifth determining unit for determining first angle information corresponding to the first form based on a fourth correspondence relationship between the form of light-reflective disperse point distribution and the angle, the first angle information being specifically the angle between the input apparatus and the touch control display unit when the input end contacts with the touch control display unit, wherein, the first angle information can be transmitted to the electronic apparatus through the transmitting device to be processed by the electronic apparatus.

The transmitting device 40 is specifically:

a wireless transmission device for transferring the deformation parameter to the electronic apparatus in wireless mode; or a wired transmission device for transferring the deformation parameter to the electronic apparatus in wired mode.

One or more technical solutions provided by the first embodiment of the present disclosure at least have the following technical effects or advantages:

Since the recognizing device obtains the first shape under press of contact pressure of the input end based on the light-reflective encode coating, and then the deformation parameter is transmitted to the touch control display unit based on the deformation parameter of the first shape, the technical problem that when the user operates on the touch control display unit using the touch control input pen, position of the touch control point is recognized through variation of capacitance value on the touch control display unit and output effect is displayed in the prior arts, display effect of only one point is displayed, and when the sizes of the contact areas of the input pen with the touch control display unit are different, size and degree of weight of the touch control point cannot be recognized effectively is solved, and technical effect of recognizing size and degree of weight of the touch control point effectively and responding to the requirement of the effect of pen contact of the user accurately according to user's need is implemented.

Currently, with the development of interacting technique between apparatus, an accurate inter-locating technique between apparatus is getting more and more important. An ultrasonic wave technology is proposed in the prior arts, wherein, at least two ultrasonic wave receiving units are provided in a specific terminal apparatus, and orientation of another apparatus transmitting the ultrasonic wave signal is calculated through the distance between the at least two ultrasonic wave receiving units and time and intensity with which the two receive signals. However, this technique depends on the distance between the at least two ultrasonic wave receiving units, and if the distance therein between is very close, the orientation of another apparatus cannot be calculated accurately. Therefore, the distance between the at least two ultrasonic wave receiving units needs to be set to relatively large. In this case, this technique cannot be applied to apparatus with a small size so as to position other apparatus accurately.

In order to solve the above-described technical problems in the prior art, according to an aspect of the embodiment of the present disclosure, there provides an electronic apparatus, including: a housing, at least one signal source provided on at least a first surface of the housing and configured to broadcast a signal; a signal modulating unit provided corresponding to the at least one signal source and configured to modulate the signal transmitted by the signal source under a signal transmitting mode, so that the modulated signal includes unique identification information related to a corresponding travel direction in a plurality of preset travel directions with respect to the at least one signal source and having preset intervals.

Further, according to an aspect of the embodiments of the present disclosure, wherein, the at least one signal source is an infrared light source configured to generate infrared light; and the signal modulating unit includes: a liquid crystal layer provided around the infrared light source, the liquid crystal layer having a plurality of pixels, and the plurality of preset travel directions being corresponding to different pixel units respectively; and a control unit configured to control transmission/non-transmission status of each pixel unit in the liquid crystal layer.

Further, according to an aspect of the embodiments of the present disclosure, the control unit controls the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

Further, according to an aspect of the embodiments of the present disclosure, when the modulated infrared light is received by another electronic apparatus, the another electronic apparatus determines the direction of the another electronic apparatus with respect to the electronic apparatus based on the unique identification information included in the modulated infrared light.

Further, according to an aspect of the embodiments of the present disclosure, the another electronic apparatus stores information related to power of the infrared light source in advance; and the intensity of the infrared light is for deciding the distance between the another electronic apparatus and the electronic apparatus when the infrared light is received by the another electronic apparatus.

Further, according to an aspect of the embodiments of the present disclosure, the at least one signal source is an ultrasonic wave generating unit configured to generate ultrasonic wave; and the signal modulating unit includes: a beam forming unit around the ultrasonic wave generating unit and configured to modulate encoding of the ultrasonic wave in the plurality of preset travel directions; and a control unit configured to control the modulation of the beam forming unit.

Further, according to an aspect of the embodiments of the present disclosure, the control unit controls the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

Further, according to an aspect of the embodiments of the present disclosure, when the modulated ultrasonic wave is received by another electronic apparatus, the another electronic apparatus determines the direction of the another electronic apparatus with respect to the electronic apparatus based on the unique identification information included in the modulated ultrasonic wave.

Further, according to an aspect of the embodiments of the present disclosure, the another electronic apparatus stores information related to power generated by the ultrasonic wave source in advance; and the intensity of the ultrasonic wave is for deciding the distance between the another electronic apparatus and the electronic apparatus when the ultrasonic wave is received by the another electronic apparatus.

Further, according to another aspect of the embodiments of the present disclosure, there is provided a signal modulating method applied in an electronic apparatus, the electronic apparatus includes: a housing, at least one signal source provided on at least a first surface of the housing; and a signal modulating unit provided corresponding to the at least one signal source, the signal modulating method includes: deciding the current mode of the electronic apparatus; and modulating the signal transmitted by the signal source with a signal modulating signal if the electronic apparatus is in a signal transmitting mode, so that the modulated signal includes unique identification information related to a corresponding travel direction in a plurality of preset travel directions with respect to the at least one signal source and having preset intervals.

Further, according to another aspect of the embodiments of the present disclosure, the at least one signal source is an infrared light source configured to generate infrared light; and the signal modulating unit includes: a liquid crystal layer provided around the infrared light source, the liquid crystal layer having a plurality of pixels, and the plurality of preset travel directions being corresponding to different pixel units respectively; and a control unit configured to control transmission/non-transmission status of each pixel unit in the liquid crystal layer Further, according to another aspect of the embodiments of the present disclosure, the step of modulating the signal transmitted by the signal source with the signal modulating signal further includes: the control unit controlling the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

Further, according to another aspect of the embodiments of the present disclosure, the unique identification information included in the modulated infrared light is for indicating the direction of the modulated infrared light with respect to the electronic apparatus.

Further, according to another aspect of the embodiments of the present disclosure, the at least one signal source is an ultrasonic wave generating unit configured to generate ultrasonic wave; and the signal modulating unit includes: beam forming unit around the ultrasonic wave generating unit and configured to modulate encoding of the ultrasonic wave in the plurality of preset travel directions; and a control unit configured to control the modulation of the beam forming unit.

Further, according to another aspect of the embodiments of the present disclosure, the step of modulating the signal transmitted by the signal source with the signal modulating signal further includes: the control unit controlling the beam forming unit to modulate encoding of the ultrasonic wave in each travel direction with different encode modes for each travel direction among the plurality of preset travel directions, so that the modulated ultrasonic wave in the plurality of preset travel directions includes different encode information as the unique identification information.

Further, according to another aspect of the embodiments of the present disclosure, wherein, the unique identification information included in the modulated ultrasonic wave is for indicating the direction of the modulated ultrasonic wave with respect to the electronic apparatus.

Hereinafter, the electronic apparatus according to the second embodiment of the present disclosure is described with reference to FIG. 5A and FIG. 5B. Here, the electronic apparatus according to the embodiments of the present disclosure may be a terminal electronic apparatus (hereinafter referred as the terminal apparatus in short) such as a smart phone, a tablet computer, a smart desktop, a notebook computer, a PC or the like.

Figure 5A:
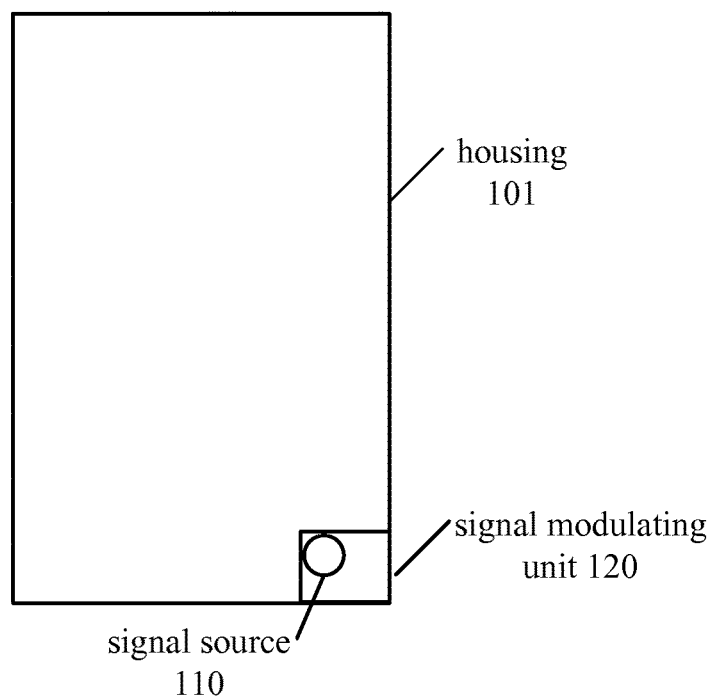
FIG. 5A is a schematic block diagram of the terminal apparatus according to the second embodiment of the present disclosure.

According to the second embodiment of the present disclosure, as shown in FIG. 5A, the terminal apparatus 100 may include a housing 101, a signal source 110 and a signal modulating unit 120.

The housing 101 may be made of any material.

The signal source 110 may be provided on a specific surface of the housing and for broadcasting a signal.

The signal modulating unit 120 can be provided corresponding to the signal source 110. According to embodiments of the present disclosure, the signal modulating unit 120 can be used for modulating a signal transmitted by the signal source 110 in a signal transmitting mode, so that the modulated signal includes an unique identification information related to the corresponding travel direction in a plurality of preset travel directions with respect to the signal source 110 and having preset intervals.

In particular, it is described by taking the signal source being the infrared light source as example.

According to embodiments of the present disclosure, the signal source 110 may be the infrared light source. Here, the infrared light source may be the infrared light source such as an infrared ray lamp and can generate (broadcast) infrared light. According to the present embodiment, as shown in FIG. 5A, the signal source 110 can be provided at one side of the terminal apparatus (for example, at frame of right lower side of the terminal apparatus 100 in FIG. 5A).

Figure 5B:
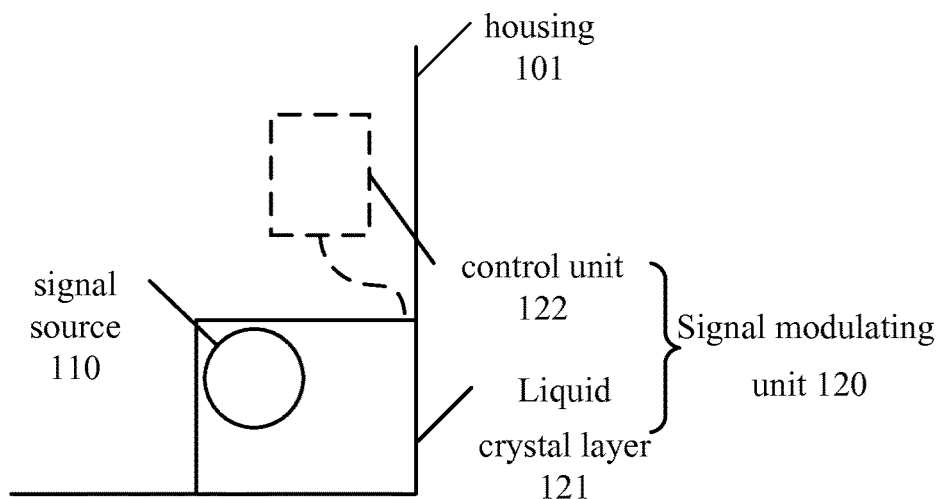
FIG. 5B is a fractional enlarged schematic diagram of the terminal apparatus according to the second embodiment of the present disclosure.

As shown in FIG. 5B, according to the present embodiment, the signal modulating unit 120 may include: a liquid crystal layer/panel 121 around the infrared light source and a control unit 122 provided. The curvature of the liquid crystal layer/panel 121 can be configured so that the liquid crystal layer/panel 121 surrounds the signal source 110. The liquid crystal layer 121 may have a plurality of pixels. Here, since the positions of the different pixels in the liquid crystal layer 121 are different, each pixel in the liquid crystal layer 121 can correspond to a plurality of preset travel directions respectively. According to embodiments of the present disclosure, the signal source 110 may be provided at the right lower side of the terminal apparatus 100 (for example, interior of the right lower frame of the terminal apparatus 100), and the liquid crystal layer 121 can be provided at a position corresponding to the position of the signal source 110 on the front surface, the rear surface and the frame, so as to surround the signal source 110. Further, the liquid crystal layer 121 may also be implemented by flexible screen techniques (showing partial spherical surface or curved surface) and surrounds the signal source 110. With this configuration, the coverage range of the signal transmitted by the signal source 110 is as large as possible. Further, the present disclosure is not limited thereto, and in order to implement a coverage range of 360 degree, other signal sources 110 and signal modulating units 120 may be provided at other positions. For example, another signal source and another signal modulating unit may be provided at the left upper frame of the terminal apparatus 100 in FIG. 5A. Further, a signal source and a signal modulating unit may be provided on the front and rear surfaces of the terminal unit 100 respectively, or the signal source and the signal modulating unit may be provided on the left and right frames and/or the top and bottom frames of the terminal apparatus 100 respectively, to maximize the coverage range of the signal source.

Control unit 122 may be an arbitrary processor or microprocessor, control unit 122 is connected to the liquid crystal layer 121, and can control transmission/non-transmission status of each pixel unit on the liquid crystal layer 121. Here, the function of the control unit 122 can be implemented by the liquid crystal panel controller or a processor of the terminal apparatus 100 based on firmware preset therein or software preset in the terminal apparatus 100, and preset function can be executed according to the firmware therein or the preset software. According to the embodiments of the present disclosure, in the case that the terminal apparatus 100 initiates signal transmitting mode (which is triggered by user's input or a specific application for positioning between apparatus), the control unit 122 can control the transmission/non-transmission status of pixel on the liquid crystal layer 121 corresponding to each travel direction with different driving modes for each travel direction in the plurality of preset travel directions. Here, since transmission/non-transmission status of each pixel on the liquid crystal layer 121 will result passing through/shielding of the infrared light irradiated on the pixel, and the passing through/shielding of infrared light would cause the infrared light to include encode information (encoding with the infrared light as a carrier), therefore, the firmware preset therein or the software preset in the terminal apparatus 100 can be configured/compiled to control the transmission/non-transmission status of each pixel on the liquid crystal layer 121, so that in a predetermined period, the transmission/non-transmission status of each pixel on the liquid crystal layer 121 alternates to cause the code signal included in the infrared light (passing through/shielding) is unique, so that different code signals correspond to different pixel on the liquid crystal layer 121 respectively, and correspond to different travel directions of the infrared light respectively. That is, the different encode information included in the modulated (passing through/shielding) infrared light in the plurality of preset travel directions is as unique identification information. For example, it is assumed that there are 256 pixels on the liquid crystal layer 121, 256 different 8-bit driving information (for example, 1 represents transmission status of the pixel, 0 represents non-transmission status of the pixel) can be set, so that alternation laws of transmission/non-transmission status of each pixel on the liquid crystal layer 121 in a predetermined period (for example, 0.1 second) are different, to identify travel directions (256 directions) of the infrared light corresponding to the pixels uniquely. Further, if there are 1024 pixels on the liquid crystal layer 121, 1024 different 10 bits driving information can be set, so that encode information of the infrared light corresponding to different pixel on the liquid crystal layer 121 are different, to identify travel directions (256 directions) of the infrared light corresponding to the pixels uniquely. Here, number of pixels on the liquid crystal layer 121 can be set according to specific requirement of accuracy, and a corresponding bit of driving information is provided based on the number of pixels on the liquid crystal layer 121, so as to make encode information of the infrared light corresponding to different pixels on the liquid crystal layer 121 be different.

According to the present embodiment, when the modulated infrared light is received by another terminal apparatus, the another terminal apparatus can determine the direction of the another terminal apparatus with respect to the terminal apparatus 100 based on the unique identification information included in the modulated infrared light. In particular, the another terminal apparatus can include an infrared light receiving unit provided on arbitrary surface (front face generally) of the another terminal apparatus. In this case, the another terminal apparatus receives the infrared light including the unique identification information through the infrared light receiving unit. Here, as described above, since the infrared light in different travel directions include unique (different) identification information, the another terminal apparatus can calculate an original direction of the infrared light by the unique identification information, so as to determine the direction of the another terminal apparatus with respect to the terminal apparatus 100. Here, if the terminal apparatus 100 (which may also include an infrared light receiving unit) and the another terminal apparatus are products of the same brand or products supporting the same standard, information related to travel directions of the infrared light represented by a plurality of unique identifications (for example, a mapping table for mapping the unique identification and the travel directions) is preset in the terminal apparatus 100 and the another terminal apparatus at the time of shipping, thereby, both the terminal apparatus 100 and the another terminal apparatus can determine the travel direction of the received infrared light according to the preset information. Further, in a period during which the terminal apparatus 100 is paired with the another terminal apparatus (for example, through blue-tooth or WIFI), the above-described information can be shared therein between, so that the terminal apparatus 100 and the another terminal apparatus can determine the travel direction of the received infrared light according to the shared information.

Further, in the case that the infrared light receiving unit (due to the reception area thereof) of the another terminal apparatus receives the infrared light in different travel directions, the another terminal apparatus can obtain a plurality of travel directions based on the unique identification of the infrared light in the plurality of travel directions, and calculates the direction of the terminal apparatus 100 with respect to the another terminal apparatus based on the plurality of travel directions (for example, by taking a median value or a middle direction of the plurality of directions). Further, in the case that the infrared light receiving unit of the another terminal apparatus receives the infrared light in the different travel directions, the another terminal apparatus can determine the travel direction of the infrared light based on the unique identification in the infrared light received earliest, so as to determine the direction of the another terminal apparatus with respect to the terminal apparatus 100. By doing so, it can avoid generation of mistaken judgment caused when the infrared light reflects a multiple times (for example, reflects at wall) to reach the another terminal apparatus.

Further, according to another specific implementation mode of the embodiments of the present disclosure, information related to power of the signal source 110 (the infrared light source) of the terminal apparatus 100 may be stored in the another terminal apparatus in advance. Here, the intensity of the infrared light is associated with the power of the signal source 110 and the propagation path of the infrared light. In this case, when the infrared light propagated in specific direction is received by the infrared light receiving unit of the another terminal apparatus, the another terminal apparatus can calculate the distance (ranging) between the another terminal apparatus and the terminal apparatus 100 according to the intensity of the infrared light received by the infrared light receiving unit and the power of the signal source 110. Further, in a period during which the terminal apparatus 100 is paired with the another terminal apparatus (for example, through blue-tooth or WIFI), the above-described power information can be shared therein between, so as to enable the another terminal apparatus to determine the distance between the terminal apparatus 100 and the another terminal apparatus according to the power information.

Through the above-described configuration, the terminal apparatus 100 enables the other terminal apparatus receiving the signal to determine the orientation thereof with the terminal apparatus 100 based on the unique identification included in the signal by providing unique identification in different travel directions of the signal of the signal source 110, and may also determine the distance therein between based on strength of the signal. Here, since the terminal apparatus 100 and other terminal apparatus do not need a plurality of receiving units to determine the orientation and the distance therein between, they are applicable to miniaturized terminal apparatus.

Further, according to another specific implementation mode of the embodiments of the present disclosure, the signal source may also be an ultrasonic wave generating unit which is able to generate ultrasonic wave. Here, the signal modulating unit may include a beam forming unit and a control unit. Similar to the description for FIG. 5A and FIG. 5B, the beam forming unit surrounds (envelops) the ultrasonic wave generating unit. The beam forming unit may be a multi-beam forming unit and can modulate encoding of the ultrasonic wave in a plurality of preset travel directions. Further, the control unit can be implemented by an arbitrary processor or microprocessor, and can control modulation of the beam forming unit.

Similar to the description for FIG. 5A and FIG. 5B, the function of the control unit can be implemented by a liquid crystal panel controller or a processor of the terminal unit 100 based on the firmware preset therein or the software preset in the terminal unit 100, and the preset function can be executed according to the firmware therein or the preset software. In the case that the terminal apparatus 100 initiates a signal transmitting mode (which is triggered by user's input or a specific application for positioning between apparatus), the control unit can control the beam forming unit to modulate the encoding of the ultrasonic wave in each travel direction with different driving modes for each travel direction in the plurality of preset travel directions, so that in a preset period (for example, 0.1 second), the modulated ultrasonic wave in the plurality of preset travel directions include different encode information as the unique identification information. Here, by using a multi-beam forming technique, the beam forming unit is driven according to preset encode for different travel directions, so that in the preset plurality of different travel directions, the encode information of the ultrasonic wave are different from each other to identify the travel direction uniquely.

Then, according to the present embodiment, when the modulated ultrasonic wave is received by the another terminal apparatus, the another terminal apparatus determines the direction of the another terminal apparatus with respect to the terminal apparatus 100 based on the unique identification information included in the modulated ultrasonic wave. In particular, the another terminal apparatus can include an ultrasonic wave receiving unit provided on arbitrary surface (front face generally) of the another terminal apparatus. In this case, the another terminal apparatus receives the ultrasonic wave including the unique identification information by the ultrasonic wave receiving unit. Here, as described above, since the ultrasonic wave in different travel directions include unique (different) identification information, the another terminal apparatus can calculate an original direction of the ultrasonic wave by the unique identification information, so as to determine the direction of the another terminal apparatus with respect to the terminal apparatus 100. Here, information related to the travel direction of the ultrasonic wave represented by the plurality of unique identifications (for example, a mapping table for mapping the unique identification and the travel direction) can be preset in the terminal apparatus 100 and the another terminal apparatus at the time of shipping, thereby both the terminal apparatus 100 and the another terminal apparatus can determine the travel directions of the received ultrasonic wave according to the preset information. Further, in a period during which the terminal apparatus 100 is paired with the another terminal apparatus (for example, through blue-tooth or WIFI), the above-described information can be shared therein between, so that the terminal apparatus 100 and the another terminal apparatus can determine the travel directions of the received infrared light according to the shared information.

Further, in the case that the ultrasonic wave receiving unit of the another terminal apparatus receives the ultrasonic wave in a different travel direction, the another terminal apparatus can determine the travel direction of the ultrasonic wave based on the unique identification in the ultrasonic wave received earliest, so as to determine the direction of the another terminal apparatus with respect to the terminal apparatus 100. By doing so, it can avoid generation of mistaken judgment caused when the ultrasonic wave reflects multiple times (for example, reflects at wall) to reach the another terminal apparatus. Further, similarly, information related to power of the signal source 110 (the ultrasonic wave generating unit) of the terminal apparatus 100 may be stored in the another terminal apparatus in advance. Here, the intensity of the ultrasonic wave is associated with the power of the signal source 110 and the propagation path of the ultrasonic wave. In this case, when the ultrasonic wave propagated in specific direction is received by the ultrasonic wave receiving unit of the another terminal apparatus, the another terminal apparatus can calculate the distance (ranging) between the another terminal apparatus and the terminal apparatus 100 according to the intensity of the ultrasonic wave received by the ultrasonic wave receiving unit and the power of the signal source 110. Further, in a period during which the terminal apparatus 100 is paired with the another terminal apparatus (for example, through blue-tooth or WIFI), the above-described power information can be shared therein between, so as to enable the another terminal apparatus to determine the distance between the terminal apparatus 100 and the another terminal apparatus according to the power information.

Hereinafter, the signal modulating method according to the second embodiment of the present disclosure is described with reference to FIG. 6. The signal modulating method can be applied to the terminal apparatus as shown in FIG. 5A and FIG. 5B. The terminal apparatus can include: a housing; at least one signal source provided on a specific surface of the housing; and a signal modulating unit provided corresponding to the at least one signal source.

Figure 6:
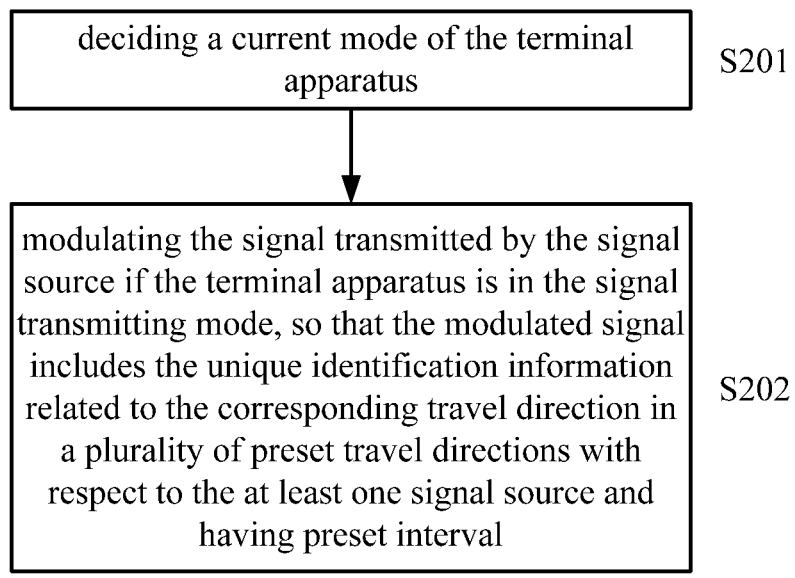
FIG. 6 is a schematic flow chart of the signal modulating method according to the second embodiment of the present disclosure.

As shown in FIG. 6, in step S201, the current mode of the terminal apparatus is decided.

In particular, the control unit 122 can determine whether the terminal apparatus 100 initiates the signal transmitting mode. Here, the signal transmitting mode can be triggered by user's input (for example, touching a button) or a specific application (positioning application). Here, if the control unit 122 detects the above-described trigger, then the control unit 122 decides whether it needs to initiate the signal transmitting mode.

Then, in step S202, the signal transmitted by the signal source is modulated if the terminal apparatus is in the signal transmitting mode, so that the modulated signal includes the unique identification information related to the corresponding travel direction in a plurality of preset travel directions with respect to the at least one signal source and having preset intervals.

In particular, in an embodiment in which the signal source 110 is the infrared light source, the signal modulating unit 120 includes a liquid crystal layer/panel 121 and a control unit 122 provided around the infrared light source. The liquid crystal layer/panel 121 surrounds the signal source 110. Here, the liquid crystal layer 121 has a plurality of pixels, and each pixel thereof can correspond to the plurality of preset travel directions respectively. For example, the signal source 110 can be provided at the right lower side of the terminal apparatus 100 (for example, in the frame of the right lower side of the terminal apparatus 100), and the liquid crystal layer 121 surrounds the signal source 110 at corresponding locations. Further, the liquid crystal layer 121 may also be implemented by flexible screen techniques (showing partial spherical surface or curved surface) and surrounds the signal source 110. Further, other signal source 110 and signal modulating unit may also be provided at other locations.

The control unit 122 is connected to the liquid crystal layer 121, and can control the transmission/non-transmission status of each pixel unit on the liquid crystal layer 121. In this case, step S302 can further include: the control unit controlling the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

In particular, since the transmission/non-transmission status of each pixel on the liquid crystal layer 121 will result in passing through/shielding of infrared light irradiated on the pixel, and the passing through/shielding of infrared light would cause the infrared light to include encode information (encoding with the infrared light as a carrier), therefore, when the terminal apparatus is in the signal transmitting mode, the control unit 122 controls the transmission/non-transmission status of each pixel on the liquid crystal layer 121, so that in a predetermined period, the transmission/non-transmission status of each pixel on the liquid crystal layer 121 alternates to cause the code signal included in the infrared light (passing through/shielding) is unique, so that different code signals correspond to different pixels on the liquid crystal layer 121 respectively, and correspond to different travel directions of the infrared light respectively. That is, the modulated (passing through/shielding) infrared light in the plurality of preset travel directions includes different encode information as the unique identification information, and the unique identification is for indicating the direction of the modulated infrared light with respect to the terminal apparatus 100. For example, it is assumed that there are 256 pixels on the liquid crystal layer 121, 256 different 8-bit driving information (for example, 1 represents transmission status of the pixel, 0 represents non-transmission status of the pixel) can be set, so that alternation laws of transmission/non-transmission status of each pixel on the liquid crystal layer 121 in a predetermined period (for example, 0.1 second) are different, to identify travel directions (256 directions) of the infrared light corresponding to the pixels uniquely. Here, number of pixels on the liquid crystal layer 121 can be set according to specific requirement of accuracy, and a corresponding bit of driving information is provided based on the number of pixels on the liquid crystal layer 121, so as to make encode information of the infrared light corresponding to different pixels on the liquid crystal layer 121 be different.

In this case, when the modulated infrared light is received by the another terminal apparatus, the another terminal apparatus can determine the direction of the another terminal apparatus with respect to the terminal apparatus 100 based on the unique identification information included in the modulated infrared light. Here, information related to the travel direction of the infrared light represented by the plurality of unique identifications (for example, a mapping table for mapping the unique identification and the travel direction) can be provided in the another terminal apparatus in advance, thereby the another terminal apparatus can determine the travel directions of the received infrared light according to the preset information. Further, in a period during which the terminal apparatus 100 is paired with the another terminal apparatus (for example, through blue-tooth or WIFI), the above-described information can be shared therein between, so that the terminal apparatus 100 and the another terminal apparatus can determine the travel direction of the received infrared light according to the shared information. Further, in the case that the infrared light receiving unit of the another terminal apparatus (which is provided on an arbitrary surface of the another terminal apparatus, and front face generally) receives infrared light in different travel directions, the another terminal apparatus can obtain a plurality of travel directions based on the unique identification of the infrared light in the plurality of travel directions, and calculate the direction of the terminal apparatus 100 with respect to the another terminal apparatus based on the plurality of travel directions (for example, by taking a median value or a middle direction of the plurality of directions). Further, in the case that the infrared light receiving unit of the another terminal apparatus receives the infrared light in different travel directions, the another terminal apparatus can determine the travel direction of the infrared light based on the unique identification in the infrared light received earliest, so as to determine the direction of the another terminal apparatus with respect to the terminal apparatus 100. By doing so, it can avoid generation of mistaken judgment caused when the infrared light reflects a multiple times (for example, reflects at wall) to reach the another terminal apparatus. Further, according to another specific implementation mode of the embodiments of the present disclosure, information related to power of the signal source 110 (the infrared light source) of the terminal apparatus 100 may be stored in the another terminal apparatus in advance. In this case, when the infrared light propagated in specific direction is received by the infrared light receiving unit of the another terminal apparatus, the another terminal apparatus can calculate the distance (ranging) between the another terminal apparatus and the terminal apparatus 100 according to the intensity of the infrared light received by the infrared light receiving unit and the power of the signal source 110. Further, the above-described power information can be shared in the period during which the terminal apparatus 100 is paired with the another terminal apparatus (for example, through blue-tooth or WIFI).

Further, in an embodiment in which the signal source 110 is an ultrasonic wave generating unit, the signal modulating unit can include a beam forming unit and a control unit. Here, the beam forming unit surrounds (envelops) the ultrasonic wave generating unit. The beam forming unit may be a multi-beam forming unit and can modulate encoding of the ultrasonic wave in a plurality of preset travel directions. Further, the control unit could control the modulation of the beam forming unit.

In this case, step S202 can further include: the control unit controlling the beam forming unit to modulate encoding of the ultrasonic wave in each travel direction with different driving modes for each travel direction in the plurality of preset travel directions, so that in a preset periods (for example, 0.1 second), the modulated ultrasonic wave in the plurality of preset travel directions include different encode information as the unique identification information. Here, the beam forming unit can be driven according to preset encode for different travel directions by using the multi-beam forming techniques, so that encode information of the ultrasonic wave are different from each other in the preset plurality of different travel directions, to identify the travel direction uniquely, that is, the unique identification information included in the modulated ultrasonic wave can be for indicating the direction of the modulated ultrasonic wave with respect to the terminal apparatus 100.

In this case, when the modulated ultrasonic wave is received by another terminal apparatus, the another terminal apparatus can determine the direction of the another terminal apparatus with respect to the terminal apparatus 100 based on the unique identification information included in modulated ultrasonic wave. Here, information related to the travel direction of the ultrasonic wave represented by the plurality of unique identifications (for example, a mapping table for mapping the unique identification and the travel direction) can be preset in the terminal apparatus 100 and the another terminal apparatus at the time of shipping, thereby the another terminal apparatus can determine the travel directions of the received ultrasonic wave according to the preset information. Further, in a period during which the terminal apparatus 100 is paired with the another terminal apparatus (for example, through blue-tooth or WIFI), the above-described information can be shared therein between, so that the terminal apparatus 100 and the another terminal apparatus can determine the travel directions of the received infrared light according to the shared information. Further, in the case that the ultrasonic wave receiving unit of the another terminal apparatus receives the ultrasonic wave in a different travel direction, the another terminal apparatus can determine the travel direction of the ultrasonic wave based on the unique identification in the ultrasonic wave received earliest, so as to determine the direction of the another terminal apparatus with respect to the terminal apparatus 100. By doing so, it can avoid generation of mistaken judgment caused when the ultrasonic wave reflects multiple times (for example, reflects at wall) to reach the another terminal apparatus. Further, similarly, information related to power of the signal source 110 (the ultrasonic wave generating unit) of the terminal apparatus 100 may be stored in the another terminal apparatus in advance. Here, the intensity of the ultrasonic wave is associated with the power of the signal source 110 and the propagation path of the ultrasonic wave. In this case, when the ultrasonic wave propagated in specific direction is received by the ultrasonic wave receiving unit of the another terminal apparatus, the another terminal apparatus can calculate the distance (ranging) between the another terminal apparatus and the terminal apparatus 100 according to the intensity of the ultrasonic wave received by the ultrasonic wave receiving unit and the power of the signal source 110. Further, in a period during which the terminal apparatus 100 is paired with the another terminal apparatus (for example, through blue-tooth or WIFI), the above-described power information can be shared therein between, so as to enable the another terminal apparatus to determine the distance between the terminal apparatus 100 and the another terminal apparatus according to the power information.

Here, those skilled in the art can understand that, the input method and input apparatus according to the first embodiment of the present disclosure, and the signal modulating method and electronic apparatus according to the second embodiment of the present disclosure can be used individually, or in combination with each other.

In particular, when the input method and the input apparatus according to the first embodiment of the present disclosure are combined with the signal modulating method and the electronic apparatus according to the second embodiment of the present disclosure, the electronic apparatus can obtain the first shape under press of the contact pressure of the input end based on the light-reflective encode coating by using the recognizing device when it contacts with the input apparatus and transmit the deformation parameter based on the first shape to the touch control display unit, the electronic apparatus can also determine the direction of the input apparatus with respect to the electronic apparatus according to the modulated signal sent from the input apparatus in the case that the input apparatus does not contact with the electronic apparatus. Therefore, the skilled person in the art can understand, the embodiments of the present disclosure do not intend to make any limitation thereto.

When the input method and the input apparatus according to the first embodiment of the present disclosure are used individually, the input method and the input apparatus according to the embodiments of the present disclosure can be configured as follows:

(1) An input method applied in an input apparatus being able to communicate with an electronic apparatus including a touch control display unit, wherein, the method includes:

a recognizing device in the input apparatus recognizing to obtain a first shape under press of contact pressure of a deformable input end of the input apparatus based on a light-reflective encode coating when the input end contacts with the touch control display unit;

the recognizing device obtaining a deformation parameter of the input end based on the first shape; and a transmitting device in the input apparatus transmitting the deformation parameter to the electronic apparatus to be processed by the electronic apparatus.

(2) The method according to the above (1), wherein, when the recognizing device is specifically an image pick-up unit, the recognizing device in the input apparatus recognizing to obtain the first shape under press of the contact pressure of the input end based on the light-reflective encode coating specifically includes:

obtaining image information including the light-reflective encode coating by the image pick-up unit when the input end contacts with the touch control display unit;

analyzing and recognizing the image information to determine that a current form of a light-reflective disperse point distribution of the light-reflective encode coating is a first form; and determining that a shape corresponding to the first form is the first shape based on a first correspondence relationship between the form of light-reflective disperse point distribution and the shape of the input end.

(3) The method according to the above (1), wherein, the recognizing device obtaining the deformation parameter of the input end based on the first shape is specifically:

determining a first deformation parameter corresponding to the first shape as the deformation parameter of the input end based on a second correspondence relationship between the shape and the parameter.

(4) The method according to the above (3), wherein, determining the first deformation parameter corresponding to the first shape as the deformation parameter of the input end based on the second correspondence relationship between the shape and the parameter specifically includes:

determining a first contact area of the input end corresponding to the first shape on the touch control display unit when the second correspondence relationship is specifically a correspondence relationship between the shape and the contact area.

(5) The method according to any one of the above (1) to (4), wherein, after the recognizing device in the input apparatus obtaining the first shape under press of the contact pressure of the input end based on the light-reflective encode coating, the method further includes:

determining first contact position information corresponding to the first form based on a third correspondence relationship between the form of light-reflective disperse point distribution and the contact position of the input end; and transmitting the first contact position information to the electronic apparatus to be processed by the electronic apparatus.

(6) The method according to any one of the above (1) to (4), wherein, after the recognizing device in the input apparatus recognizing to obtain the first shape under press of the contact pressure of the input end based on the light-reflective encode coating, the method further includes:

determining first angle information corresponding to the first form based on a fourth correspondence relationship between the form of light-reflective disperse point distribution and the angle, the first angle information being specifically information of the angle between the input apparatus and the touch control display unit when the input end contacts with the touch control display unit; and transmitting the first angle information to the electronic apparatus to be processed by the electronic apparatus.

(7) The method according to any one of the above (1) to (4), wherein, the transmitting device in the input apparatus transmitting the deformation parameter to the electronic apparatus is specifically:

a wireless transmitting device in the input apparatus transferring the deformation parameter to the electronic apparatus in a wireless mode; or a wired transmitting device in the input apparatus transferring the deformation parameter to the electronic apparatus in wired mode.

(8) An input apparatus being able to communicate with an electronic apparatus including a touch control display unit, wherein, the input apparatus includes:

an input end made of electro-conductive deformable material and in which a light-reflective encode coating is provided;

a hold body connected to the input end and in which a recognizing device and a transmitting device are provided;

wherein, when the input end contacts with the touch control display unit, the recognizing device recognizes to obtain a first shape under press of a contact pressure of the input end based on the light-reflective encode coating, and obtains a deformation parameter of the input end based on the first shape; the deformation parameter is transmitted to the electronic apparatus by the transmitting device to be processed by the electronic apparatus.

(9) The input apparatus according to the above (8), wherein, the recognizing device includes:

an image pick-up unit by which image information including the light-reflective encode coating is obtained when the input end contacts with the touch control display unit;

a first determining unit for analyzing and recognizing the image information to determine that a current form of light-reflective disperse point distribution of the light-reflective encode coating is the first form; and a second determining unit for determining that the shape corresponding to the first form is the first shape based on a first correspondence relationship between the form of light-reflective disperse point distribution and the shape of the input end.

(10) The input apparatus according to the above (8), wherein, the recognizing device further includes:

a third determining unit for determining a first deformation parameter corresponding to the first shape as the deformation parameter of the input end based on a second correspondence relationship between the shape and the parameter.

(11) The input apparatus according to the above (10), wherein, the third determining unit is specifically a determining unit for determining a first contact area of the input end on the touch control display unit corresponding to the first shape when the second correspondence relationship is specifically a correspondence relationship between the shape and the contact area.

(12) The input apparatus according to any one of the above (8) to (11), wherein, the recognizing device further includes:

a fourth determining unit for determining first contact position information corresponding to the first form based on a third correspondence relationship between the form of light-reflective disperse point distribution and the contact position of the input end, wherein, the first contact position information is transmitted to the electronic apparatus by the transmitting device to be processed by the electronic apparatus.

(13) The input apparatus according to any one of the above (8) to (11), wherein, the recognizing device further includes:

a fifth determining unit for determining first angle information corresponding to the first form based on a fourth correspondence relationship between the form of light-reflective disperse point distribution and the angle, the first angle information being specifically the angle between the input apparatus and the touch control display unit when the input end contacts with the touch control display unit, wherein, the first angle information is transmitted to the electronic apparatus through the transmitting device to be processed by the electronic apparatus.

(14) The input apparatus according to any one of the above (8) to (11), wherein, the transmitting device is specifically:

a wireless transmitting device for transferring the deformation parameter to the electronic apparatus in wireless mode; or a wired transmitting device for transferring the deformation parameter to the electronic apparatus in wired mode.

When the input method and the input apparatus according to the first embodiment of the present disclosure are combined with the signal modulating method and the electronic apparatus according to the second embodiment of the present disclosure, the input method and the input apparatus according to the embodiments of the present disclosure can be configured as follows.

(15) The input method according to any one of the above (1) to (7), wherein, the input apparatus further includes:

a housing;

at least one signal source provided on at least a first surface of the housing; and a signal modulating unit provided corresponding to the at least one signal source, the method further includes:

deciding a current mode of the input apparatus; and modulating the signal transmitted by the signal source if the input apparatus is in a signal transmitting mode, so that the modulated signal includes unique identification information related to a corresponding travel direction in a plurality of preset travel directions with respect to the at least one signal source and having preset intervals.

(16) The method according to the above (15), wherein:

the at least one signal source is an infrared light source configured to generate infrared light; and the signal modulating unit includes an liquid crystal layer provided around the infrared light source, the liquid crystal layer has a plurality of pixels, and the plurality of preset travel directions correspond to different pixel units respectively; and a control unit configured to control a transmission/non-transmission status of each pixel unit on the liquid crystal layer.

(17) The method according to the above (16), wherein, the step of modulating the signal transmitted by the signal source further includes:

the control unit controlling the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

(18) The method according to the above (17), wherein:

the unique identification information included in the modulated infrared light is for indicating the direction of the modulated infrared light with respect to the input apparatus.

(19) The method according to the above (15), wherein:

the at least one signal source is an ultrasonic wave generating unit configured to generate ultrasonic wave; and the signal modulating unit includes a beam forming unit surrounding the ultrasonic wave generating unit and configured to modulate encoding of the ultrasonic wave in the plurality of preset travel directions; and a control unit configured to control the modulation of the beam forming unit.

(20) The method according to the above (16), wherein, the step of modulating the signal transmitted by the signal source further includes:

the control unit controlling the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

(21) The method according to the above (20), wherein:
the unique identification information included in the modulated ultrasonic wave is for indicating the direction of the modulated ultrasonic wave with respect to a terminal apparatus.

(22) The input apparatus according to any one of the above (8) to (14), further including:
a housing;
at least one signal source provided on at least a first surface of the housing and configured to broadcast signal; and
a signal modulating unit provided corresponding to the at least one signal source and configured to modulate the signal transmitted by the signal source in a signal transmitting mode, so that the modulated signal includes unique identification information related to a corresponding travel direction in a plurality of preset travel directions with respect to the at least one signal source and having preset intervals.

(23) The input apparatus according to the above (22), wherein:
the at least one signal source is an infrared light source configured to generate infrared light; and
the signal modulating unit includes:
a liquid crystal layer provided around the infrared light source, the liquid crystal layer having a plurality of pixels, and the plurality of preset travel direction corresponding to different pixel units respectively; and
a control unit configured to control a transmission/non-transmission status of each pixel unit on the liquid crystal layer.

(24) The input apparatus according to the above (23), wherein:
the control unit controls the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

(25) The input apparatus according to the above (24), wherein:
when the modulated infrared light is received by the electronic apparatus, the electronic apparatus determines the direction of the electronic apparatus with respect to the input apparatus based on the unique identification information included in the modulated infrared light.

(26) The input apparatus according to the above (25), wherein:
the electronic apparatus stores information related to power of the infrared light source in advance; and
intensity of the infrared light is for deciding a distance between the electronic apparatus and the input apparatus when the infrared light is received by the electronic apparatus.

(27) The input apparatus according to the above (22), wherein:
the at least one signal source is an ultrasonic wave generating unit configured to generate ultrasonic wave; and
the signal modulating unit includes:
a beam forming unit around the ultrasonic wave generating unit and configured to modulate encoding of the ultrasonic wave in the plurality of preset travel directions; and
a control unit configured to control the modulation of the beam forming unit.

(28) The input apparatus according to the above (27), wherein:
the control unit controls the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

(29) The input apparatus according to the above (28), wherein:
when modulated ultrasonic wave is received by the electronic apparatus, the electronic apparatus determines the direction of the electronic apparatus with respect to the input apparatus based on the unique identification information included in modulated ultrasonic wave.

(30) The input apparatus according to the above (29), wherein:
the electronic apparatus stores information related to power generated by the ultrasonic wave in advance; and
intensity of the ultrasonic wave is for deciding a distance between the electronic apparatus and the input apparatus when the ultrasonic wave is received by the electronic apparatus.

When the signal modulating method and the electronic apparatus according to the second embodiment of the present disclosure are used individually, the electronic apparatus and the signal modulating method according to the embodiments of the present disclosure are configured as follows.

(31) An electronic apparatus, including:
a housing;
at least one signal source provided on at least a first surface of the housing and configured to broadcast signal; and
a signal modulating unit provided corresponding to the at least one signal source and configured to modulate the signal transmitted by the signal source in a signal transmitting mode, so that the modulated signal includes unique identification information related to a corresponding travel direction in a plurality of preset travel directions with respect to the at least one signal source and having preset intervals.

(32) The electronic apparatus according to the above (31), wherein:
the at least one signal source is an infrared light source configured to generate infrared light; and
the signal modulating unit includes:
a liquid crystal layer provided around the infrared light source, the liquid crystal layer having a plurality of pixels, and the plurality of preset travel direction corresponds to different pixel units respectively; and
a control unit configured to control a transmission/non-transmission status of each pixel unit on the liquid crystal layer.

(33) The electronic apparatus according to the above (32), wherein:
the control unit controls the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

(34) The electronic apparatus according to the above (33), wherein:

when the modulated infrared light is received by another electronic apparatus, the another electronic apparatus determines the direction of the another electronic apparatus with respect to the electronic apparatus based on the unique identification information included in the modulated infrared light.

(35) The electronic apparatus according to the above (34), wherein:

the another electronic apparatus stores information related to power of the infrared light source in advance; and intensity of the infrared light is for deciding a distance between the another electronic apparatus and the electronic apparatus when the infrared light is received by the another electronic apparatus.

(36) The electronic apparatus according to the above (31), wherein:

the at least one signal source is an ultrasonic wave generating unit configured to generate ultrasonic wave; and the signal modulating unit includes:

a beam forming unit around the ultrasonic wave generating unit and configured to modulate encoding of the ultrasonic wave in the plurality of preset travel directions; and a control unit configured to control the modulation of the beam forming unit.

(37) The electronic apparatus according to the above (36), wherein:

the control unit controls the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

(38) The electronic apparatus according to the above (37), wherein:

when modulated ultrasonic wave is received by another electronic apparatus, the another electronic apparatus determines the direction of the another electronic apparatus with respect to the electronic apparatus based on the unique identification information included in modulated ultrasonic wave.

(39) The electronic apparatus according to the above (37), wherein:

the another electronic apparatus stores information related to power generated by the ultrasonic wave in advance; and intensity of the ultrasonic wave is for deciding the distance between the another electronic apparatus and the electronic apparatus when the ultrasonic wave is received by the another electronic apparatus.

(40) A signal modulating method applied in an electronic apparatus including a housing, at least one signal source provided on at least a first surface of the housing, and a signal modulating unit provided corresponding to the at least one signal source, wherein, the signal modulating method includes:

deciding a current mode of the electronic apparatus; and modulating the signal transmitted by the signal source if the electronic apparatus is in a signal transmitting mode, so that the modulated signal includes unique identification information related to a corresponding travel direction in a plurality of preset travel directions with respect to the at least one signal source and having preset intervals.

(41) The method according to the above (40), wherein:

the at least one signal source is an infrared light source configured to generate infrared light; and the signal modulating unit includes an liquid crystal layer provided around the infrared light source, the liquid crystal layer having a plurality of pixels, and the plurality of preset travel directions corresponding to different pixel units respectively; and a control unit configured to control a transmission/non-transmission status of each pixel unit on the liquid crystal layer.

(42) The method according to the above (41), wherein, the step of modulating the signal transmitted by the signal source further includes:

the control unit controls the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

(43) The method according to the above (42), wherein:

the unique identification information included in the modulated infrared light is for indicating the direction of the modulated infrared light with respect to the electronic apparatus.

(44) The method according to the above (40), wherein:

the at least one signal source is an ultrasonic wave generating unit configured to generate ultrasonic wave; and the signal modulating unit includes a beam forming unit surrounding the ultrasonic wave generating unit and configured to modulate encoding of the ultrasonic wave in the plurality of preset travel directions; and a control unit configured to control the modulation of the beam forming unit.

(45) The method according to the above (41), wherein, the step of modulating the signal transmitted by the signal source further includes:

the control unit controls the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

(46) The method according to the above (45), wherein:

the unique identification information included in the modulated ultrasonic wave is for indicating the direction of the modulated ultrasonic wave with respect to the electronic apparatus.

Further, those skilled in the art can understand, the above-described (15) to (30) incorporate technical features of the signal modulating method and the electronic apparatus according to the second embodiment of the present disclosure into technical solutions of the input method and the input apparatus according to the first embodiment of the present disclosure. Further, when the input method and the input apparatus according to the first embodiment of the present disclosure are combined with the signal modulating method and the electronic apparatus according to the second embodiment of the present disclosure, the technical features of the input method and the input apparatus according to the first embodiment of the present disclosure can also be incorporated into the technical solutions of the signal modulating method and the electronic apparatus according to the second embodiment of the present disclosure. In this case, the electronic apparatus and the signal modulating method according to the embodiments of the present disclosure are configured as follows.

(47) The electronic apparatus according to any one of the above (31) to (39), which is able to communicate with another electronic apparatus, the another electronic apparatus including a touch control display unit, wherein, the electronic apparatus further includes:

an input end made of electro-conductive deformable material and in which a light-reflective encode coating is provided; and a hold body connected to the input end and in which a recognizing device and a transmitting device are provided;

wherein, when the input end contacts with the touch control display unit, the recognizing device recognizes to obtain a first shape under press of a contact pressure of the input end based on the light-reflective encode coating, and obtains a deformation parameter of the input end based on the first shape; the deformation parameter is transmitted to the another electronic apparatus by the transmitting device to be processed by the another electronic apparatus.

(48) The electronic apparatus according to the above (47), wherein, the recognizing device includes:

an image pick-up unit by which image information including the light-reflective encode coating is obtained when the input end contacts with the touch control display unit;

a first determining unit for analyzing and recognizing the image information to determine that a current form of light-reflective disperse point distribution of the light-reflective encode coating is the first form; and a second determining unit for determining that the shape corresponding to the first form is the first shape based on a first correspondence relationship between the form of light-reflective disperse point distribution and the shape of the input end.

(49) The electronic apparatus according to the above (47), wherein, the recognizing device further includes:

a third determining unit for determining a first deformation parameter corresponding to the first shape as the deformation parameter of the input end based on a second correspondence relationship between the shape and the parameter.

(50) The electronic apparatus according to the above (49), wherein, the third determining unit is specifically a determining unit for determining a first contact area of the input end on the touch control display unit corresponding to the first shape when the second correspondence relationship is specifically a correspondence relationship between the shape and the contact area.

(51) The electronic apparatus according to any one of the above (47) to (50), wherein, the recognizing device further includes:

A fourth determining unit for determining first contact position information corresponding to the first form based on a third correspondence relationship between the form of light-reflective disperse point distribution and the contact position of the input end, wherein, the first contact position information is transmitted to the another electronic apparatus by the transmitting device to be processed by the another electronic apparatus.

(52) The input apparatus according to any one of the above (47) to (50), wherein, the recognizing device further includes:

a fifth determining unit for determining first angle information corresponding to the first form based on a fourth correspondence relationship between the form of light-reflective disperse point distribution and the angle, the first angle information being specifically the angle between the input apparatus and the touch control display unit when the input end contacts with the touch control display unit, wherein, the first angle information is transmitted to the another electronic apparatus through the transmitting device to be processed by the another electronic apparatus.

(53) The input apparatus according to any one of the above (47) to (50), wherein, the transmitting device is specifically:

a wireless transmitting device for transferring the deformation parameter to the another electronic apparatus in wireless mode; or a wired transmitting device for transferring the deformation parameter to the another electronic apparatus in wired mode.

(54) The signal modulating method according to any one of the above (40) to (46), which is applied in an electronic apparatus being able to communicate with another electronic apparatus including a touch control display unit, wherein, the method further includes:

a recognizing device in the electronic apparatus recognizing to obtain a first shape under press of contact pressure of a deformable input end of the electronic apparatus based on a light-reflective encode coating when the input end contacts with the touch control display unit;

the recognizing device obtaining a deformation parameter of the input end based on the first shape; and a transmitting device in the input apparatus transmitting the deformation parameter to the another electronic apparatus to be processed by the another electronic apparatus.

(55) The method according to the above (54), wherein, when the recognizing device is specifically an image pick-up unit, the recognizing device in the electronic apparatus recognizing to obtain the first shape under press of the contact pressure of the input end based on the light-reflective encode coating specifically includes:

obtaining image information including the light-reflective encode coating by the image pick-up unit when the input end contacts with the touch control display unit;

analyzing and recognizing the image information to determine that a current form of a light-reflective disperse point distribution of the light-reflective encode coating is a first form; and determining that a shape corresponding to the first form is the first shape based on a first correspondence relationship between the form of light-reflective disperse point distribution and the shape of the input end.

(56) The method according to the above (54), wherein, the recognizing device obtaining the deformation parameter of the input end based on the first shape is specifically:

determining a first deformation parameter corresponding to the first shape as the deformation parameter of the input end based on a second correspondence relationship between shapes and parameters.

(57) The method according to the above (56), wherein, determining the first deformation parameter corresponding to the first shape as the deformation parameter of the input end based on the second correspondence relationship between shapes and parameters specifically includes:

determining a first contact area of the input end corresponding to the first shape on the touch control display unit when the second correspondence relationship is specifically a correspondence relationship between the shape and the contact area.

(58) The method according to any one of the above (54) to (57), wherein, after the recognizing device in the electronic apparatus recognizing to obtain the first shape under press of the contact pressure of the input end based on the light-reflective encode coating, the method further includes:

determining first contact position information corresponding to the first form based on a third correspondence relationship between the form of light-reflective disperse point distribution and the contact position of the input end; and transmitting the first contact position information to the another electronic apparatus to be processed by the another electronic apparatus.

(59) The method according to any one of the above (54) to (57), wherein, after the recognizing device in the electronic apparatus recognizing to obtain the first shape under press of the contact pressure of the input end based on the light-reflective encode coating, the method further includes:

determining first angle information corresponding to the first form based on a fourth correspondence relationship between the form of light-reflective disperse point distribution and the angle, the first angle information being specifically information of the angle between the electronic apparatus and the touch control display unit when the input end contacts with the touch control display unit; and transmitting the first angle information to the another electronic apparatus to be processed by the another electronic apparatus.

(60) The method according to any one of the above (54) to (57), wherein, the transmitting device in the input apparatus transmitting the deformation parameter to the another electronic apparatus is specifically:

a wireless transmitting device in the electronic apparatus transferring the deformation parameter to the another electronic apparatus in a wireless mode; or a wired transmitting device in the electronic apparatus transferring the deformation parameter to the another electronic apparatus in wired mode.

The respective embodiments of the present disclosure are described in detail above. However, those skilled in the art should understand, these embodiments can be made various modifications, combinations or sub-combinations without departing from the principles and spirits of the present disclosure, and such modifications should fall into the scope of the present disclosure.

Those skilled in the art should understand that, the embodiments of the present disclosure can be provided as a method, a system or a computer program product. Therefore, the present disclosure can adopt forms of a full hardware embodiment, a full software embodiment, or an embodiment combining software and hardware aspects. And, the present disclosure can adopt forms of a computer program product implemented on one or more computer usable storage mediums (including, but not limited to, magnetic disk storage, CD-ROM, optical memory or the like) including computer usable program codes.

The present disclosure is described by referring to flow charts and/or block diagrams of method, apparatus (system) and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processor of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Further, it needs to be noted that, in the specification, terms of "comprise", "include" and any other variations thereof intend to cover nonexclusive inclusion so that the procedure, the method, the product or the equipment including a series of elements not only includes these elements, but also include other elements which are not listed explicitly, or also include inherent elements of these procedure, method, product or equipment. In case that there is no more limitation, the element defined by statement of "including one . . . " does not exclude there is an additional same element in the procedure, method, article or apparatus including the element.

Finally, it should be noted that, the above-described series of processing does not only comprise processing executed chronologically in the order mentioned here, and also comprise processing executed in parallel or individually but not chronologically.

Though some embodiments of the present disclosure are shown and described, those skilled in the art should understand, these embodiments can be carried out various modifications without departing from the principles and spirits of the present disclosure, and such modifications should fall into the scope of the present disclosure.

The invention claimed is:

1. An input method applied in an input apparatus being able to communicate with an electronic apparatus including a touch control display unit, the method comprises:

a recognizing device in the input apparatus recognizing to obtain a first shape under press of contact pressure of a deformable input end of the input apparatus based on a light-reflective encode coating comprising light-reflective disperse points when the input end contacts with the touch control display unit;

the recognizing device obtaining a deformation parameter of the input end based on the first shape; and a transmitting device in the input apparatus transmitting the deformation parameter to the electronic apparatus to be processed by the electronic apparatus, when the recognizing device is an image pick-up unit, the recognizing device in the input apparatus recognizing to obtain the first shape under press of the contact pressure of the input end based on the light-reflective encode coating further comprises:

obtaining image information including the light-reflective encode coating by the image pick-up unit when the input end contacts the touch control display unit;

analyzing and recognizing the image information to determine that a current form of a light-reflective disperse point distribution of the light-reflective encode coating is a first form; and determining that a shape corresponding to the first form is the first shape based on a first correspondence relationship between the form of light-reflective disperse point distribution and the shape of the input end.

2. The input method according to claim 1, wherein, the recognizing device obtaining the deformation parameter of the input end based on the first shape further comprises determining a first deformation parameter corresponding to the first shape as the deformation parameter of the input end based on a second correspondence relationship between shapes and parameters.

3. The input method according to claim 2, wherein, determining the first deformation parameter corresponding to the first shape as the deformation parameter of the input end based on the second correspondence relationship between shapes and parameters further comprises determining a first contact area of the input end corresponding to the first shape on the touch control display unit when the second correspondence relationship is a correspondence relationship between the shape and the contact area.

4. The input method according to claim 1, wherein, after the recognizing device in the input apparatus recognizing to obtain the first shape under press of the contact pressure of the input end based on the light-reflective encode coating, the method further comprises:
determining first contact position information corresponding to the first form based on a third correspondence relationship between the form of light-reflective disperse point distribution and the contact position of the input end; and
transmitting the first contact position information to the electronic apparatus to be processed by the electronic apparatus.

5. The input method according to claim 1, wherein, after the recognizing device in the input apparatus recognizing to obtain the first shape under press of the contact pressure of the input end based on the light-reflective encode coating, the method further comprises:
determining first angle information corresponding to the first form based on a fourth correspondence relationship between the form of light-reflective disperse point distribution and the angle, the first angle information being information of the angle between the input apparatus and the touch control display unit when the input end contacts with the touch control display unit; and
transmitting the first angle information to the electronic apparatus to be processed by the electronic apparatus.

6. The input method according to claim 1, wherein, the transmitting device in the input apparatus transmitting the deformation parameter to the electronic apparatus comprises:
a wireless transmitting device in the input apparatus transferring the deformation parameter to the electronic apparatus in a wireless mode; or
a wired transmitting device in the input apparatus transferring the deformation parameter to the electronic apparatus in wired mode.

7. The input method according to claim 1, wherein, the input apparatus further includes:
a housing;
at least one signal source provided on at least a first surface of the housing; and
a signal modulating unit provided corresponding to the at least one signal source, the method further comprises:
deciding a current mode of the input apparatus; and
modulating the signal transmitted by the signal source if the input apparatus is in a signal transmitting mode, so that the modulated signal includes unique identification information related to a corresponding travel direction in a plurality of preset travel directions with respect to the at least one signal source and having preset intervals.

8. The input method according to claim 7, wherein:
the at least one signal source is an infrared light source configured to generate infrared light; and
the signal modulating unit includes an liquid crystal layer provided around the infrared light source, the liquid crystal layer having a plurality of pixels, and the plurality of preset travel directions corresponding to different pixel units respectively; and a control unit configured to control a transmission/non-transmission status of each pixel unit on the liquid crystal layer.

9. The input method according to claim 8, wherein, the step of modulating the signal transmitted by the signal source further comprises the control unit controlling the transmission/non-transmission status of the pixel on the liquid crystal layer corresponding to each travel direction with different encode modes respectively for each travel direction among the plurality of preset travel directions, so that the modulated infrared light in the plurality of preset travel directions includes different encode information as the unique identification information.

10. The input method according to claim 8, wherein, the step of modulating the signal transmitted by the signal source further comprises the control unit controlling the beam forming unit to modulate the encoding of the ultrasonic wave in each travel direction with different encode modes for each travel direction among the plurality of preset travel directions, so that the modulated ultrasonic wave in the plurality of preset travel directions includes different encode information as the unique identification information.

11. The input method according to claim 7, wherein:
the at least one signal source is an ultrasonic wave generating unit configured to generate ultrasonic wave; and
the signal modulating unit includes a beam forming unit surrounding the ultrasonic wave generating unit and configured to modulate encoding of the ultrasonic wave in the plurality of preset travel directions; and a control unit configured to control the modulation of the beam forming unit.

12. An input apparatus being able to communicate with an electronic apparatus including a touch control display unit, wherein, the input apparatus comprises:
an input end made of electro-conductive deformable material and in which a light-reflective encode coating is provided; and
a hold body connected to the input end and in which a recognizing device and a transmitting device are provided;
wherein, when the input end contacts with the touch control display unit, the recognizing device recognizes to obtain a first shape under press of a contact pressure of the input end based on the light-reflective encode coating comprising light-reflective disperse points, and obtains a deformation parameter of the input end based on the first shape; the deformation parameter is transmitted to the electronic apparatus by the transmitting device to be processed by the electronic apparatus,
wherein, the recognizing device comprises:
an image pick-up unit by which image information including the light-reflective encode coating is obtained when the input end contacts with the touch control display unit;

a first determining unit for analyzing and recognizing the image information to determine that a current form of light-reflective disperse point distribution of the light-reflective encode coating is the first form; and a second determining unit for determining that the shape corresponding to the first form is the first shape based on a first correspondence relationship between the form of light-reflective disperse point distribution and the shape of the input end.

13. The input apparatus according to claim 12, wherein, the recognizing device further comprises third determining unit for determining a first deformation parameter corresponding to the first shape as the deformation parameter of the input end based on a second correspondence relationship between the shape and the parameter.

14. The input apparatus according to claim 13, wherein, the third determining unit comprises a determining unit for determining a first contact area of the input end on the touch control display unit corresponding to the first shape when the second correspondence relationship is a correspondence relationship between the shape and the contact area.

15. The input apparatus according to claim 12, wherein, the recognizing device further comprises a fourth determining unit for determining first contact position information corresponding to the first form based on a third correspondence relationship between the form of light-reflective disperse point distribution and the contact position of the input end, wherein, the first contact position information is transmitted to the electronic apparatus by the transmitting device to be processed by the electronic apparatus.

16. The input apparatus according to claim 12, wherein, the recognizing device further comprises a fifth determining unit for determining first angle information corresponding to the first form based on a fourth correspondence relationship between the form of light-reflective disperse point distribution and the angle, the first angle information being the angle between the input apparatus and the touch control display unit when the input end contacts with the touch control display unit, wherein, the first angle information is transmitted to the electronic apparatus through the transmitting device to be processed by the electronic apparatus.

17. The input apparatus according to claim 12, wherein, the transmitting device comprises:

a wireless transmitting device for transferring the deformation parameter to the electronic apparatus in wireless mode; or a wired transmitting device for transferring the deformation parameter to the electronic apparatus in wired mode.

* * * * *